United States Patent
Fukazu et al.

(10) Patent No.: US 10,302,127 B2
(45) Date of Patent: May 28, 2019

(54) NEEDLE BEARING

(71) Applicant: E I DU PONT DE NEMOURS AND COMPANY, Wilmington, DE (US)

(72) Inventors: Isao Fukazu, Tochigi (JP); Satoru Sekiguchi, Tochigi-Ken (JP)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/565,184

(22) PCT Filed: Apr. 26, 2016

(86) PCT No.: PCT/US2016/029348
§ 371 (c)(1),
(2) Date: Oct. 9, 2017

(87) PCT Pub. No.: WO2016/176199
PCT Pub. Date: Nov. 3, 2016

(65) Prior Publication Data
US 2018/0080497 A1  Mar. 22, 2018

Related U.S. Application Data

(60) Provisional application No. 62/153,685, filed on Apr. 28, 2015.

(51) Int. Cl.
| | | |
|---|---|---|
| *F16C 33/46* | (2006.01) | |
| *F16C 19/46* | (2006.01) | |
| *C08L 79/08* | (2006.01) | |
| *F16C 19/22* | (2006.01) | |
| *C08G 73/10* | (2006.01) | |
| *F16C 33/34* | (2006.01) | |

(52) U.S. Cl.
CPC ........ *F16C 19/463* (2013.01); *C08G 73/1042* (2013.01); *C08G 73/1067* (2013.01); *C08L 79/08* (2013.01); *F16C 19/22* (2013.01); *F16C 33/34* (2013.01); *F16C 33/4635* (2013.01); *F16C 33/4676* (2013.01); *F16C 2202/06* (2013.01); *F16C 2202/08* (2013.01); *F16C 2208/00* (2013.01); *F16C 2208/40* (2013.01); *F16C 2208/80* (2013.01); *F16C 2316/10* (2013.01)

(58) Field of Classification Search
CPC ......... C08J 2379/08; C08L 79/08; C21D 9/36
See application file for complete search history.

(56) References Cited

U.S. PATENT DOCUMENTS

| | | |
|---|---|---|
| 3,179,614 A | 4/1965 | Edwards |
| 3,249,588 A | 5/1966 | Shellbourne |
| 4,169,933 A | 10/1979 | Jackson, Jr. et al. |
| 4,238,600 A | 12/1980 | Jackson, Jr. et al. |
| 4,242,496 A | 12/1980 | Jackson, Jr. et al. |
| 5,886,129 A | 3/1999 | Decolibus |
| 2003/0099416 A1* | 5/2003 | Kinno ................ C23C 14/0605 384/492 |
| 2009/0232432 A1* | 9/2009 | Egami ................ C10M 161/00 384/464 |

FOREIGN PATENT DOCUMENTS

EP   2157135 A1   2/2010

OTHER PUBLICATIONS

Li et al MRI Compatible Robot Systems for Medical Intervention, Advances in Robot Manipulators, Ernest Hall (Ed.), Dec. 2010.*
Jackson W.J. (1984) Liquid Crystal Polymers: VI. Liquid Crystalline Polyesters of Substituted Hydroquinones. In: Vandenberg E.J. (eds) Contemporary Topics in Polymer Science. Springer, Boston, MA.
Du Pont: "VESPEL: using vespel bearings", Apr. 30, 1997 (Apr. 30, 1997), XP055294676, Retrieved from the Internet: URL:http://www.dupont.com/content/dam/dupont/products-and-services/plastics-polymers-and-resins/parts-and-shapes/vespel/documents/E61500.pdf [retrieved on Aug. 10, 2016] the whole document.
PCT International Search Report and Written Opinion for International Application No. PCT/US2016/029348 dated Aug. 10, 2016.

* cited by examiner

*Primary Examiner* — Gregory Listvoyb

(57) ABSTRACT

The present invention relates to a non-magnetic needle bearing for use in a rotational machine such as, for example, an MRI. The needle bearing may include needles, a cylindrical retainer holding the needles at a predetermined pitch, an outer ring outside of the retainer, and an inner ring inside the retainer. All of the aforementioned may be made of a non-thermoplastic polyimide resin.

10 Claims, 2 Drawing Sheets

FIG. 4    13
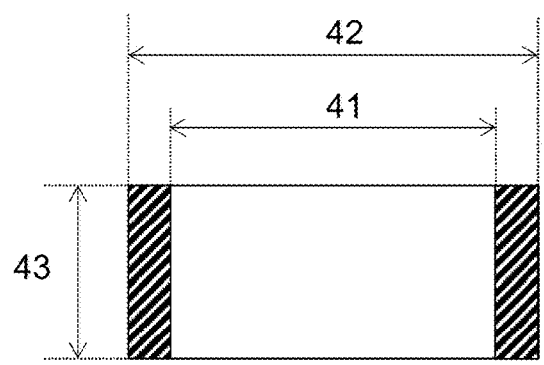
FIG. 5    14
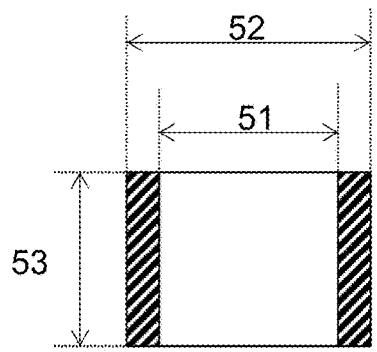

NEEDLE BEARING

CROSS-REFERENCE TO RELATED APPLICATION

This application claims priority under 35 U.S.C. § 119 to U.S. Provisional Application No. 62/153,685, filed on Apr. 28, 2015, which is incorporated herein by reference in its entirety.

FIELD OF THE INVENTION

The disclosure relates generally to needle bearings, and more particularly, non-thermoplastic polyimide needle bearings.

BACKGROUND OF THE INVENTION

A plastic needle bearing which is non-magnetic is desirable. A plastic needle bearing is also so lightweight that noise made during rotation could be reduced.

US2010027933 discloses a needle bearing having bearing ring made of a austenitic steel with a total carbon and nitrogen content of from 0.8 to 1.2% by weight, and needles made from a ceramic.

SUMMARY OF THE INVENTION

An aspect of the present invention relates to a needle bearing comprising needles, a cylindrical retainer holding the needles at a predetermined pitch, an outer ring disposed outside the retainer and an inner ring disposed inside the retainer, wherein the needles, the retainer, the outer ring and the inner ring are made of a non-thermoplastic polyimide resin.

An aspect of the present invention relates to a rotational machine comprising a needle bearing, wherein the needle bearing comprises needles, a cylindrical retainer holding the needles at a predetermined pitch, an outer ring disposed outside the retainer and an inner ring disposed inside the retainer, wherein the needles, the retainer, the outer ring and the inner ring are made of a non-thermoplastic polyimide resin.

The present invention can provide the needle bearing made of a non-thermoplastic polyimide resin that sufficiently withstands the wear while it is non-magnetic and lightweight.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 4 depicts a cross-sectional view cutting plane parallel to a rotating shaft an embodiment of an outer ring; and FIG. 5 depicts a cross-sectional view cutting plane parallel to a rotating shaft an embodiment of an inner ring.

DETAILED DESCRIPTION OF THE INVENTION

A needle bearing includes needles, a cylindrical retainer, an outer ring and an inner ring. The needles, the retainer, the outer ring and the inner ring are made of a non-thermoplastic polyimide resin.

A needle bearing is described below with reference to FIGS. 1 to 5.

Figure 1:
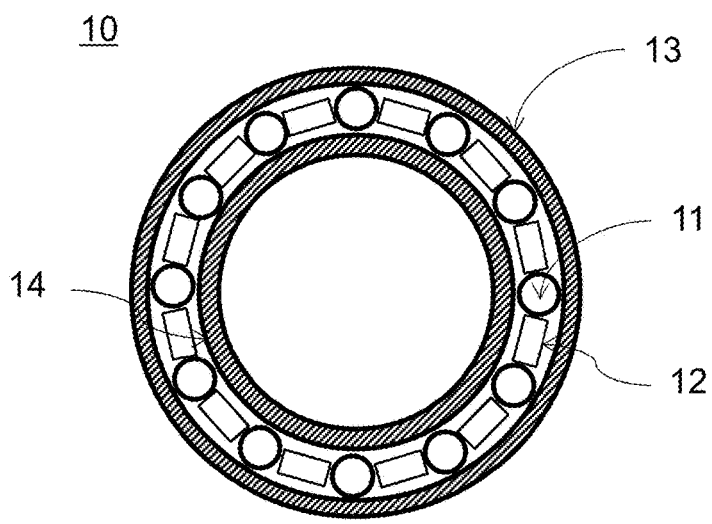
FIG. 1 depicts a cross-sectional view cutting plane perpendicular to a rotating shaft of an embodiment of a needle bearing.

As shown in FIG. 1, a needle bearing 10 comprises needles 11, a cylindrical retainer 12 holding the needles 11 at a predetermined pitch, an outer ring 13 disposed outside the retainer 12 and an inner ring 14 disposed inside the retainer 12. The retainer 12 is interposed between the outer ring 13 and the inner ring 14. The needle bearing 10 is set on a shaft. The needle bearing 10 uses the needles 11 to maintain the separation between the outer ring 13 and the inner ring 14. Rotational friction can be reduced by using the outer ring 13, the inner ring 14 and needles 11 therebetween. The outer ring 13 is stationary and the inner ring 14 that is attached to a shaft rotates as the shaft rates. As the inner ring 14 rotates it causes the needles 11 to rotate as well.

Needle

Figure 2:
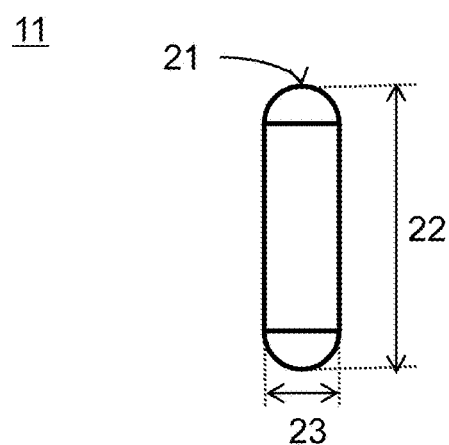
FIG. 2 depicts a side view of an embodiment of a needle.

The needle 11 is cylindrical as shown in FIG. 2 in an embodiment. Both ends 21 of the needle 11 are curved to respectively contact the retainer 12 at one point in an embodiment. The ends 21 are hemisphere in another embodiment. A needle bearing 10 using the needles 11 with curved ends 21 could reduce noise during operation of a machine.

Needle length 22 could be about 8 mm to about 30 mm in an embodiment, about 10 mm to about 25 mm in another embodiment, and about 12 mm to about 20 mm in another embodiment.

Needle width 23 could be about 1 mm to about 10 mm in an embodiment, about 2 mm to about 7 mm in another embodiment, and about 3 mm to about 5 mm in another embodiment.

Retainer

Figure 3:
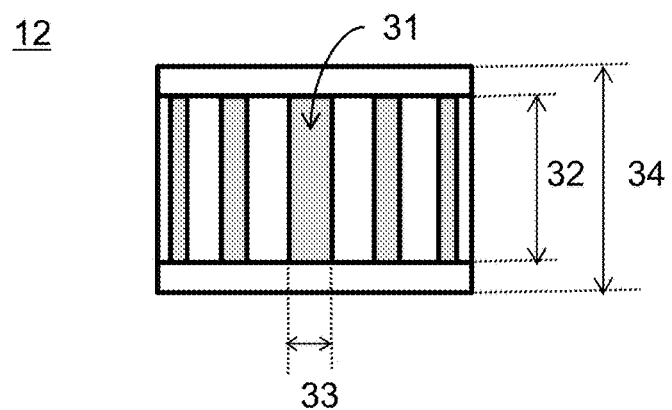
FIG. 3 depicts a side view of an embodiment of a retainer.

The cylindrical retainer 12 has a plurality of holes 31 to hold the needles 11 as shown in FIG. 3. Each hole-size can be slightly larger than the needle size in an embodiment. The hole-length 32 is 0.05 to 0.1 mm longer than the needle length 22 in an embodiment. The hole-width 33 is 0.05 to 1 mm wider than the needle width 23 in an embodiment. Retainer thickness can be 1 to 10 mm in an embodiment, 2 to 8 mm in another embodiment, and 3.5 to 7 mm in another embodiment. The retainer 12 could have height 34 in a range from about 10 to about 55 mm in an embodiment, about 15 to about 40 mm in another embodiment, and about 20 to about 30 mm in another embodiment. The height 34 of the retainer 12 is the length of the retainer in shaft direction of the needle bearing.

Outer Ring

An outer ring 13 could be hollow and generally cylindrical in shape as shown in FIG. 4. The outer ring 13 could have an inside diameter 41 in a range from about 20 to about 50 mm in an embodiment, about 24 to about 42 mm in another embodiment, and about 28 to about 38 mm in another embodiment. The outer ring 13 could have an outside diameter 42 in a range from about 22 to about 60 mm in an embodiment, about 30 to about 55 mm in another embodiment, and about 43 to about 50 mm in another embodiment. The outer ring 13 could have height 43 in a range from about 10 to about 55 mm in an embodiment, about 15 to about 40 mm in another embodiment, and about 20 to about 30 mm in another embodiment. The height 43 of the outer ring 13 is the length of the outer ring in shaft direction of the needle bearing. Thickness of the outer ring 13 could be in a range from about 1 to about 30 mm in an embodiment, about 3 to about 20 mm in another embodiment, and about 5 to about 10 mm in another embodiment.

Inner Ring

An inner ring 14 is hollow and generally cylindrical in shape as well as the outer ring as shown in FIG. 5. The inner ring 14 could have an inside diameter 51 in a range from about 10 to about 45 mm in an embodiment, about 15 to about 38 mm in another embodiment, and about 18 to about 25 mm in another embodiment. The inner ring 14 could have an outside diameter 52 in a range from about 10 to about 50 mm in an embodiment, about 15 to about 40 mm in another embodiment, and about 21 mm to about 30 mm in another embodiment. The inner ring 14 could have height 53 in a range from about 10 to about 55 mm in an embodiment, about 15 to about 40 mm in another embodiment, and about 20 to about 30 mm in another embodiment. The height 53 of the inner ring 14 is the length of the inner ring in shaft direction of the needle bearing 10. Thickness of an inner ring 14 could be in a range from about 1 to about 12 mm in an embodiment, about 1.5 to about 8 mm in another embodiment, and about 2 to about 4 mm in another embodiment.

Materials

The needles 11, the retainer 12, the outer ring 13 and the inner ring 14 are made of non-thermoplastic polyimide resin. A needle bearing 10 made from a non-thermoplastic polyimide resin could be lightweight and sufficiently withstands the wear.

Non-thermoplastic Polyimide Resins

Non-thermoplastic polyimide is a polyimide that has a 2-dimensional linear molecular structure but has no thermal melting property. Thermal melting property here means the reversible property of becoming fluid as the temperature rises above glass transition temperature (Tg), or melting point (Tm), and solidifying again as the temperature falls; non-thermoplastic polyimides are not heat-melting either because they do not exhibit a clear Tg or Tm, or because the Tg, or Tm is so high that the material exhibits conspicuous thermal decomposition at or below these temperatures. More specifically, the non-thermoplastic polyimide resin is used to describe a polyimide component that has a Tg greater than 280° C. in an embodiment, greater than 350° C. in another embodiment, and greater than 400° C. in another embodiment, and no discernable Tg in temperatures up to at least 400° C. in another embodiment.

The non-thermoplastic polyimide resin is prepared from at least one diamine and at least one dianhydride in an embodiment.

The diamine can be selected from the group consisting of m-phenylene diamine (MPD), p-phenylene diamine (PPD), 4,4'-oxydianiline (ODA), methylene dianiline (MDA) toluene diamine (TDA) and a mixture thereof in an embodiment. The diamine can be selected from the group consisting of m-phenylene diamine (MPD), p-phenylene diamine (PPD), 4,4'-oxydianiline (ODA) and a mixture thereof in another embodiment.

The dianhydride can be a tetracarboxylic acid dianhydride in an embodiment. The dianhydride can be selected from the group consisting of benzophenone tetracarboxylic dianhydride (BTDA), 3,3',4,4'-biphenyltetracarboxylic dianhydride (BPDA), trimellitic anhydride (TMA), pyromellitic dianhydride (PMDA), maleic anhydride (MA), nadic anhydride (NA) and a mixture thereof in another embodiment. The anhydride can be selected from the group consisting of pyromellitic dianhydride (PMDA), 3,3',4,4'-biphenyltetracarboxylic dianhydride (BPDA) and a mixture thereof in another embodiment.

The non-thermoplastic polyimides may be prepared from a combinations of anhydride and diamine selected from the group consisting of BTDA-MPD, TMA-MDA, BTDA-TDA-MPD, BTDA-MDA-NA, TMA-MPD, TMA-ODA, BPDA-ODA, BPDA-MPD, BPDA-PPD, BPDA-MPD-PPD, BTDA-4,4'-diaminobenzophenone, and BTDA-bis(p-phenoxy)-p,p'-biphenyl in an embodiment. The non-thermoplastic polyimide may be prepared from a combination of diamine and at least one dianhydride of PMDA-ODA or BPDA-MPD-PPD in another embodiment. In another embodiment, the non-thermoplastic polymer can be the poly(BPDA-co(PPD; MPD)).

The non-thermoplastic polyimide used in the needle bearing 10 generally has a low friction coefficient and a high wear resistance.

In one embodiment, the non-thermoplastic polyimide resin is prepared by reacting at least one diamine with at least one tetracarboxylic acid dianhydride.

The diamine can comprise a structure of:

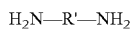

wherein R' is a divalent, aromatic radical in an embodiment.

The tetracarboxylic acid dianhydride can comprise a structure of:

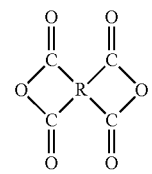

wherein R is a tetravalent radical containing at least one ring of six carbon atoms characterized by benzenoid unsaturation, the four carboxyl groups of said dianhydride being attached directly to different carbon atoms in a ring of the R radical in an embodiment.

The reaction temperature can be below 175° C. in an embodiment or below 100° C. in another embodiment to form the polyamide acid. The formed polyamide acid is then converted to the polyimide while in solution by heating in the presence of tertiary amine which acts as a Lewis base in an embodiment. The tertiary amine can form the solvent for the polymerization reaction, or can form part of the solvent for the polymerization reaction or can be added after polymerization. The polyamide acid as a polyimide precursor becomes the corresponding polyimide when being heated or chemically treated.

In an embodiment, a polymer chain of the non-thermoplastic polyimide resin comprises a repeating unit represented by the following formula:

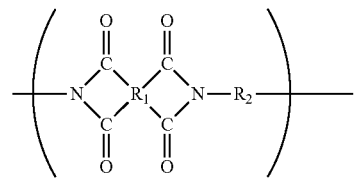

wherein $R_1$ is a tetravalent aromatic radical having 1 to 5 benzenoid-unsaturated rings of 6 carbon atoms, the four carbonyl groups being directly bonded to different carbon atoms in a benzene ring of the $R_1$ radical and each pair of carbonyl groups being bonded to adjacent carbon atoms in the benzene ring of the $R_1$ radical; and $R_2$ is a divalent aromatic radical having 1 to 5 benzenoid-unsaturated rings of carbon atoms, the two amino groups being directly bonded to different carbon atoms in the benzene ring of the $R_2$ radical.

Structurally speaking, non-thermoplastic polyimides include wholly aromatic polyimides, which are polyimides in the narrow sense of the word, and these wholly aromatic polyimides are preferably non-thermoplastic polyimides in an embodiment. A wholly aromatic polyimide here is an aromatic polyimide that has an imide group directly bound to an aromatic ring, and that either contains no aliphatic carbon, or has no hydrogen directly bound to the carbon if such is present in an embodiment.

In an embodiment, the polyamide acid can be represented as a repeating unit of the following general formula, wherein the polyamide acid can be either a homopolymer or copolymer of two or more of the repeating units:

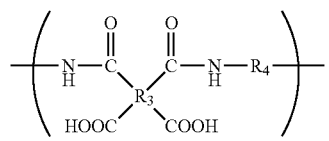

wherein $R_3$ is a tetravalent aromatic radical having 1 to 5 benzenoid-unsaturated rings of 6 carbon atoms, the four carbonyl groups being directly bonded to different carbon atoms in a benzene ring of the $R_3$ radical and each pair of carbonyl groups being bonded to adjacent carbon atoms in the benzene ring of the $R_3$ radical; and $R_4$ is a divalent aromatic radical having 1 to 5 benzenoid-unsaturated rings of carbon atoms, the two amino groups being directly bonded to different carbon atoms in the benzene ring of the $R_4$ radical.

The resulting polyimide slurry may be washed with solvent and dried at about 100 to about 230° C. in an embodiment; at about 140 to about 190° C. in another embodiment; or at about 150 to 180° C. in another embodiment to convert the polyimide slurry to a polyimide resin in the form of a powder having a high surface area. Depending on the particle size resulting from the precipitation of polyamide acid from the reaction solution, the particles of polyimide may be further modified for example, by suitable grinding techniques, to provide a desirable particle size for handling and subsequent molding.

The surface area for the non-thermoplastic polyimide resin powder may be at least about 20 m²/g in an embodiment or at least about 75 m²/g in another embodiment, to achieve acceptable physical properties and for ease of processability.

The oxidatively stable, rigid, aromatic polyimide compositions for use in the needle bearing 10 may be molded under elevated pressures to a wide variety of configurations. In an embodiment, the non-thermoplastic polyimide resin powder may be molded at pressures of about 50,000 psi to about 100,000 psi (about 345 Mpa to about 690 Mpa) at an ambient temperature.

The non-thermoplastic polyimide resin composition can optionally further comprise filler. Filler may be used to improve wear and frictional characteristics of the needle bearing while retaining the excellent tensile and oxidative stability of the polyimides. The filler selected, as well as the quantities used, will, of course, depend on the effect desired in the final composition. The filler can be carbonaceous fillers in an embodiment. The filler which can be used with the non-thermoplastic polyimide could be graphite, molybdenum disulfide, kaolinite clay, polytetrafluoroethylene polymers or a mixture thereof in another embodiment. The filler can be graphite in another embodiment.

The incorporation of filler into the polyimide composition can extend the range of its utility as a wear resistant material. The filler is commercially available in a wide variety of forms as a fine powder and may typically be admixed with a polymer solution before precipitation of the polyimide from the solution. The average particle size of the filler may vary widely, but can be in a range from about 5 to about 75 microns (μm) in an embodiment, about 5 to about 25 μm in another embodiment. The total concentration of the filler introduced into the polyimide resin may vary with the final wear properties desired for a needle bearing. The filler can be about 5 to about 30% by volume in an embodiment based on the volume of the needle bearing. The filler can be from about 1 to about 30 wt. % in an embodiment, 5 to 20 wt. % in another embodiment based on the non-thermoplastic polyimide resin composition.

In another embodiment, the non-thermoplastic polyimide resin can be blended with a non-polyimide polymer. The blended non-thermoplastic polyimide resin may exhibit greatly reduced wear and friction characteristics.

The thermoplastic polymer can be a polyamide, a polyester resin or a mixture thereof in an embodiment. The non-thermoplastic polyimide resin can be in range from about 5 to about 30 wt % in an embodiment, from about 1 to about 20 wt % in another embodiment based on the total weight of the polymer. The non-polyimide could be melt processible at a temperature of less than about 400° C. in an embodiment.

The non-polyimide may be selected from polyamide, polyester resins and a mixture thereof in an embodiment. Melt processible is used in its conventional sense, that the polymer may be processed in an extrusion apparatus at the indicated temperatures without substantial degradation of the polymer. Such polymers may include polyamides or polyesters.

A wide variety of polyamides and/or polyesters may be blended with the non-thermoplastic polyimides. For example, polyamides which may be used include nylon 6; nylon 6,6; nylon 6,10; and nylon 6,12 in an embodiment. Polyesters which may be used include polybutylene terephthalate and polyethylene terephthalate in an embodiment.

A fusible or melt processible polyamide or polyester may be in the form of a liquid crystal polymer (LCP). LCPs are generally polyesters, including, but not limited to, polyesteramides and polyesterimides. Suitable LCPs are described in U.S. Pat. Nos. 4,169,933; 4,242,496; and 4,238,600, as well as in "Liquid Crystal Polymers: VI Liquid Crystalline Polyesters of Substituted Hydroquinones."

In preparation of the non-thermoplastic polyimide compositions additionally comprising the non-polyimide, the order of addition of the components still may not be critical. The components, the polyimide, the inorganic and the non-polyimide, and optionally filler, may be blended in the required quantities using conventional milling techniques.

For the non-thermoplastic polyimide resin, U.S. Pat. Nos. 3,179,614, 3,249,588, 5,886,129, and 5,886,129 can be incorporated herein by reference in its entirety.

The non-thermoplastic polyimide resins are commercially available from E.I. du Pont de Nemours and Company of Wilmington, Del., U.S.A. under the DuPont™ Vespel® brand, S grade of materials. Examples of DuPont™ Vespel® brand, S grade of materials include SP-1, SP-3, SP-21, SP-22, SP-211, SP-214, SP-224, SP-2515, SCP-5000, SCP-5009, SCP-50094, and SCP-5050, which is suitable for the needle bearing described herein.

Referring to FIG. 1, the non-thermoplastic polyimide resin compositions described herein may be separately processed to form each part, the needles 11, the retainer 12, the outer ring 13 and the inner ring 14 by direct forming the compositions at a pressure of about 100,000 psi in an embodiment. The resultant parts 11 to 14 can be sintered for three hours at a temperature of about 400° C. under nitrogen at atmospheric pressure. The aforementioned parts 11 to 14 can be purchased from E.I. du Pont de Nemours and Company.

After direct forming of parts 11 to 14, they can be assembled.

Tensile strength of the non-thermoplastic polyimide resin is from about 30 to about 280 MPa at 23° C. in an embodiment, from about 40 to about 250 MPa at 23° C. in another embodiment, and from about 50 to about 200 MPa at 23° C. in another embodiment. Tensile strength measures the force required to pull a something such as a structural beam to the point where it breaks. Tensile strength of a material is the maximum amount of tensile stress that it can take before failure, for example breaking. ASTM D1708 is available to measure the tensile strength.

Coefficient of friction (COF) of the non-thermoplastic polyimide resin is from about 0.01 to about 0.7 at PV=3.4 MPa·m/sec in an embodiment, and from about 0.03 to about 0.6 at PV=3.4 MPa·m/sec in another embodiment, from about 0.05 to about 0.5 at PV=3.4 MPa·m/sec in another embodiment. COF describes the ratio of the force of friction between two bodies and the force pressing them together. Coefficients of friction range from near zero to greater than one. ASTM G77 is available to measure the coefficient of friction.

Flexural strength of the non-thermoplastic polyimide resin is from about 50 to about 500 MPa at 23° C. in an embodiment, from about 65 to about 400 MPa at 23° C. in another embodiment, and from about 80 to about 300 MPa at 23° C. in another embodiment. Flexural strength, also known as bend strength, is a mechanical parameter for brittle material to define a material's ability to resist deformation under load. ASTM D790 is available to measure the flexural strength.

Flexural modulus of the non-thermoplastic polyimide resin is from about 2000 to about 8000 MPa at 23° C. in an embodiment, from about 2500 to about 7300 MPa at 23° C. in another embodiment, and from about 3000 to about 6500 MPa at 23° C. in another embodiment. Flexural modulus is the ratio of stress to strain in flexural deformation or the tendency for a material to bend. ASTM D790 is available to measure the flexural modulus.

The needles 11, the retainer 12, the outer ring 13 and the inner ring 14 are all made of the same non-thermoplastic polyimide resin in an embodiment.

In an embodiment, the needle bearing is all made of the non-thermoplastic polyimide resin.

In another embodiment, the needle bearing comprises no ceramic.

In another embodiment, the needle bearing comprises no metal.

When defining a first non-thermoplastic polyimide resin (SCP-5000) as a polyimide resin derived from at least p-phenylene diamine (PPD), m-phenylene diamine (MPD) and 3,3',4,4'-biphenyltetracarboxylic dianhydride (BPDA); a second non-thermoplastic polyimide resin (SP-21) as a polyimide resin derived from 4,4'-oxydianiline (ODA) and pyromellitic dianhydride (PMDA), the needle 11, the outer ring 13 and the inner ring 14 are made of the first non-thermoplastic polyimide resin (SCP-5000) and the retainer is made of the second non-thermoplastic polyimide resin (SP-21) in another embodiment.

First Non-thermoplastic Polyimide Resin

The first non-thermoplastic polyimide resin could be prepared from at least a p-phenylene diamine (PPD) and a m-phenylene diamine (MPD) and 3,3',4,4'-biphenyltetracarboxylic dianhydride (BPDA).

When using a solution imidization process, an aromatic tetracarboxylic dianhydride component may be reacted with a mixture of a p-phenylene diamine (PPD) and m-phenylene diamine (MPD) as the diamine component to form a reaction solution, which may then be subsequently imidized in solution and precipitated, such that the resulting polyimide composition exhibits sufficiently oxidative stability and excellent tensile strength properties.

In an embodiment, a polymer chain of the first non-thermoplastic polyimide resin comprises a repeating unit represented by the following formula:

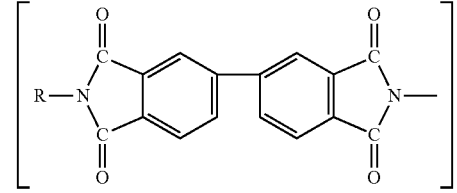

wherein R may be greater than about 60 to about 85 mole % PPD units and about 15 to about 40 mole % MPD units.

The term rigid polyimide is meant to connote that there are no flexible linkages in the polyimide unit.

The tensile strength of the first non-thermoplastic polyimide resin is from about 80 to about 250 MPa at 23° C. in an embodiment, from about 90 to about 220 MPa at 23° C. in another embodiment, and from about 100 to about 200 MPa at 23° C. in another embodiment.

The coefficient of friction (COF) of the first non-thermoplastic polyimide resin is from about 0.07 to about 0.6 at PV=3.4 MPa·m/sec in an embodiment, from about 0.08 to about 0.55 at PV=3.4 MPa·m/sec in another embodiment, and from about 0.1 to about 0.5 at PV=3.4 MPa·m/sec in an embodiment.

The flexural strength of the first non-thermoplastic polyimide resin is from about 150 to about 350 MPa at 23° C. in an embodiment from about 185 to about 330 MPa at 23° C. in another embodiment, and from about 190 to about 300 MPa at 23° C. in another embodiment.

The flexural modulus of the first non-thermoplastic polyimide resin is from about 4500 to about 6900 MPa at 23° C. in an embodiment, from about 4650 to about 6700 MPa at 23° C. in another embodiment, and from about 4800 to about 6500 MPa at 23° C. in another embodiment.

The first non-thermoplastic polyimide resin could comprise no filler in an embodiment.

The first non-thermoplastic polyimide resins comprising oxidatively stable, rigid, aromatic polyimides are commercially available from E.I. du Pont de Nemours and Company of Wilmington, Del., U.S.A. under the DuPont™ Vespel® brand, S grade of materials. Examples of DuPont™ Vespel® brand, S grade of materials include SCP-5000, SCP-5009, SCP-50094, and SCP-5050, all of which are suitable for the needle bearings described herein.

Second Non-thermoplastic Polyimide Resin

The second non-thermoplastic polyimide compositions may be prepared from pyromellitic dianhydride (PMDA) and 4,4'-oxydianiline (ODA) in an embodiment.

When using a solution imidization process, an aromatic tetracarboxylic dianhydride component may be reacted with a mixture of pyromellitic dianhydride (PMDA) and 4,4'-oxydianiline (ODA) to form a reaction solution, which may then be subsequently imidized in solution and precipitated.

In an embodiment, a polymer chain of the second non-thermoplastic polyimide resin comprises a repeating unit represented by the following formula:

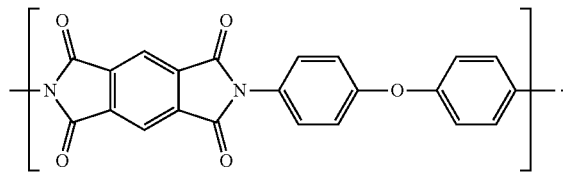

The second non-thermoplastic polyimide could comprise filler in an embodiment. Filler may be incorporated into a polymer solution prior to precipitation resulting in the second non-thermoplastic polyimide resin comprising filler. The filler can be 10 to 20 wt. % based on the weight of the second non-thermoplastic polyimide resin composition in an embodiment. The filler can be graphite in an embodiment.

The tensile strength of the second of the non-thermoplastic polyimide resin is from about 45 to about 100 MPa at 23° C. in an embodiment, from about 48 to about 90 MPa at 23° C. in another embodiment, and from about 50 to about 80 MPa at 23° C. in another embodiment.

The coefficient of friction (COF) of the second non-thermoplastic polyimide resin is from about 0.01 to about 0.4 at PV=3.4 MPa·m/sec in an embodiment, from about 0.03 to about 0.35 at PV=3.4 MPa·m/sec in an embodiment, from about 0.05 to about 0.3 at PV=3.4 MPa·m/sec in an embodiment, and from about 0.1 to about 0.3 at PV=3.4 MPa·m/sec in another embodiment.

The flexural strength of the second non-thermoplastic polyimide resin is from about 60 to about 180 MPa at 23° C. in an embodiment from about 70 to about 170 MPa at 23° C. in another embodiment, from about 80 to about 160 MPa at 23° C. in another embodiment, and from about 71 to about 100 MPa at 23° C. in another embodiment.

The flexural modulus of the second non-thermoplastic polyimide resin is from about 2500 to about 4600 MPa at 23° C. in an embodiment, from about 2750 to about 4400 MPa at 23° C. in another embodiment, and from about 3000 to about 4100 MPa at 23° C. in another embodiment.

The second non-thermoplastic polyimide resins containing graphite are commercially available from E.I. du Pont de Nemours and Company of Wilmington, Del., U.S.A. under the DuPont™ Vespel® brand, S grade of materials. Examples of DuPont™ Vespel® brand, S grade of materials include: SP-1, SP-3, SP-21, SP-22, SP-211, SP-214, SP-224, and SP-2515, all of which are suitable for the needle bearings disclosed and described herein.

The needle bearing can be equipped in any rotational machine. The rotational machine can be a magnetic resonance imaging (MRI) in an embodiment. The needle bearing can be equipped in a MRI machine requiring non-magnetic parts, for example as parts of an imaging table in another embodiment.

The terms "first", "second", and the like, herein do not denote any order, quantity, or importance, but rather are used to distinguish one element from another, and the terms "a" and "an" herein do not denote a limitation of quantity, but rather denotes the presence of at least one of the referenced items. The modifier "about" used in connection with a quantity is inclusive of the state value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "to about 25 wt %, or, more specifically, about 5 to about 20 wt %", is inclusive of the endpoints and all intermediate values of ranges of "about 5 to about 25 wt %", etc.)

While various embodiments are described herein, it will be appreciated from the specification that various embodiments of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

EXAMPLE

The present invention is illustrated by, but is not limited to, the following examples.

Example 1

A retainer, needle, upper layer and lower layer made of the non-thermoplastic polyimide resins were processed by cutting work. The needle, upper layer and lower layer retainer were made of a first non-thermoplastic polyimide resin (Vespel® SCP-5000 from E.I. du Pont de Nemours and Company of Wilmington, Del., U.S.A) and the retainer was made of a second non-thermoplastic polyimide resin (Vespel® SP-21 from E.I. du Pont de Nemours and Company of Wilmington, Del., U.S.A) as shown in Table 1.

First non-thermoplastic polyimide resin (Vespel® SCP-5000): tensile strength 163 MPa at 23° C.; coefficient of friction (COF) 0.15 at PV=3.4 MPa·m/sec; flexural strength 254 MPa at 23° C.; flexural modulus 5760 MPa at 23° C. Second non-thermoplastic polyimide resin (Vespel® SP-21): tensile strength 62.0 MPa at 23° C.; coefficient of friction (COF) 0.24 at PV=3.4 MPa·m/sec; flexural strength 82.7 MPa at 23° C.; flexural modulus 3171 MPa at 23° C.

The sizes are: Retainer 40 mm long, 40 mm wide, 1.5 mm thick with a square hole of 21 mm long and 14 mm wide in the center; Needle 20 mm long and 3 mm wide (diameter); Upper layer: 100 mm long, 100 mm wide, 5 mm thick with two guide grooves of 24.5 mm long and 5.5 mm wide; Lower layer: 100 mm long, 100 mm wide, 2 mm thick.

The retainer 63 and the needle 67 were placed on the inner layer 65. The outer layer 61 was put over the retainer 63 and the needle 67 in the square hole of the retainer as shown in FIG. 6. The assembled was set on an aluminum plate 69 in a reciprocating sliding machine. The aluminum plate 63 slides back and forth in the horizontal direction under load of 13.7 N in the vertical direction at the upper side of the outer layer 61. The outer layer 61 was fixed to not move while sliding. The sliding test condition was 196 mm/sec. speed and 420 cycle/minute for two hours. The wear amount of the needle 67 by friction between the needle 67 and the inner layer 65, the needle 67 and the outer layer 61 was observed after the reciprocating sliding test by measuring the diameter of the needle 67. The wear amount of the needle was calculated with the equation [Needle diameter after the reciprocating sliding test-Needle diameter before the reciprocating sliding test (3 mm)]. Less wear amount is preferable for longer use.

Example 2 and 3

A retainer, needle, upper layer and lower layer were made in the same manner of Example 1 except for using different combinations of the non-thermoplastic polyimide resins as shown in Table 1. The wear amount was measured as Example 1.

Comparative Example 1

A retainer, needle, upper layer and lower layer were made in the same manner of Example 1 except for using polytetrafluoroethylene resin (Teflon®, E. I. du Pont de Nemours and Company of Wilmington, Del., U.S.A) to form the needle instead of Vesper® SCP-5000 as shown in Table 1. The wear amount was measured after the reciprocating sliding test as well as Example 1.
Result The result is shown in Table 1. The needle diameter did not decrease more than 5 μm when the all parts were made of non-thermoplastic polyimide resin (Vespel® SCP-5000 or SP-21, Example 1 to 3) while the needle made of polytetrafluoroethylene resin (Teflon®, Comparative Example 1) wore 7 μm in diameter.

TABLE 1

|  | Example 1 | Example 2 | Example 3 | Comparative Example 1 |
|---|---|---|---|---|
| Needle | Vespel ® SCP-5000 | Vespel ® SP-21 | Vespel ® SCP-5000 | Teflon ® |
| Retainer | Vespel ® SP-21 | Vespel ® SP-21 | Vespel ® SCP-5000 | Vespel ® SP-21 |
| Outer/Inner layer | Vespel ® SCP-5000 | Vespel ® SCP-5000 | Vespel ® SCP-5000 | Vespel ® SCP-5000 |
| Needle diameter (μm)* | −1.3 | −3.7 | −3.7 | −7.0 |

*[Needle diameter after the reciprocating sliding test − Needle diameter before the reciprocating sliding test (3 mm)]

What is claimed is:

1. A needle bearing comprising needles, a cylindrical retainer holding the needles at a predetermined pitch, an outer ring disposed outside the retainer and an inner ring disposed inside the retainer, wherein the outer ring, the inner ring and the needles are made of a first non-thermoplastic polyimide resin comprising a repeating unit represented by the following formula:

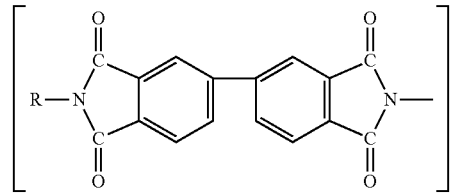

wherein R comprises p-phenylene diamine (PPD) units and m-phenylene diamine (MPD) units;
and the retainer is made of a second non-thermoplastic polyimide resin comprising a repeating unit represented by the following formula:

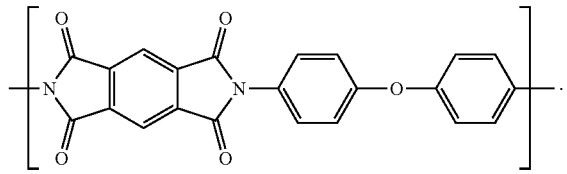

2. The needle bearing of claim 1, wherein the needle bearing comprises no ceramic or metal.

3. The needle bearing of claim 1, wherein the second non-thermoplastic polyimide resin further comprises filler.

4. The needle bearing of claim 1, wherein tensile strength of the first non-thermoplastic polyimide resin is from about 80 to about 250 MPa at 23° C., and the tensile strength of the second non-thermoplastic polyimide resin is from about 45 to about 100 MPa at 23° C.

5. The needle bearing of claim 1, wherein coefficient of friction (COF) of the first non-thermoplastic polyimide resin is from about 0.07 to about 0.6 at PV=3.4 MPa·m/sec and coefficient of friction (COF) of the second non-thermoplastic polyimide resin is from about 0.01 to about 0.4 at PV=3.4 MPa·m/sec.

6. The needle bearing of claim 1, wherein flexural strength of the first non-thermoplastic polyimide resin is from about 150 to about 350 MPa at 23° C., and flexural strength of the second non-thermoplastic polyimide resin is from about 60 to about 180 MPa at 23° C.

7. The needle bearing of claim 1, wherein flexural modulus of the first non-thermoplastic polyimide resin is from about 4500 to about 6900 MPa at 23° C., and flexural modulus of the second non-thermoplastic polyimide resin is from about 2500 to about 4600 MPa at 23° C.

8. A rotational machine comprising at least one needle bearing of claim 1.

9. The rotational machine of claim 8, wherein the rotational machine is a magnetic resonance imaging (MRI).

10. The needle bearing of claim 1, wherein R comprises greater than about 60 to about 85 mole % (PPD) units and about 15 to about 40 mole % m-phenylene diamine (MPD) units.

* * * * *